United States Patent [19]

Terashima et al.

[11] 4,331,184

[45] May 25, 1982

[54] DEVELOPER QUALITY MONITORING DEVICE

[75] Inventors: Isamu Terashima; Masayoshi Sunada, both of Hitachi, Japan

[73] Assignee: Hitachi, Ltd., Tokyo, Japan

[21] Appl. No.: 127,634

[22] Filed: Mar. 6, 1980

[30] Foreign Application Priority Data

Mar. 14, 1979 [JP] Japan ................................ 54/28708

[51] Int. Cl.[3] ........................ B65B 3/26; G01G 15/00

[52] U.S. Cl. .................................. 141/94; 73/432 R; 141/192; 222/DIG. 1; 355/3 DD

[58] Field of Search .......................... 73/432 R, 32 R; 222/DIG. 1; 354/3 DD; 141/94, 192

[56] References Cited

U.S. PATENT DOCUMENTS

| | | | |
|---|---|---|---|
| 4,210,864 | 7/1980 | Miyakawa | 355/3 DD |
| 4,230,070 | 10/1980 | Murasaki | 355/3 DD |
| 4,240,375 | 12/1980 | Terashima | 355/3 DD |
| 4,257,348 | 3/1981 | Prohaska | 355/3 DD |

*Primary Examiner*—Frederick R. Schmidt
*Attorney, Agent, or Firm*—Craig and Antonelli

[57] ABSTRACT

A developer quality monitoring device for monitoring the mixed state of toners and carriers in the developer used for developing a latent image formed on a recording medium, wherein a developer circulating mechanism and a toner density detector are used in common, an electrical signal representative of a decrement of toner density and a magnitude of pulsations is produced, and by using this electrical signal, decay condition of the developer is monitored and decay condition limit is discriminated.

12 Claims, 7 Drawing Figures

DEVELOPER QUALITY MONITORING DEVICE

BACKGROUND OF THE INVENTION

1. Field of the Invention

The present invention generally relates to developer quality monitoring devices and more particularly to a developer quality monitoring device which can monitor deterioration in the state of a developer consisting of carriers admixed with toners, the state being in particular electrostatic adherence of the toners to the carriers.

2. Description of the Prior Art

In electrophotographic copying apparatus and electrostatic recording apparatus, an electrostatic latent image formed on a recording medium is developed with a developer into a visual image. In many applications, the developer used for the development is a mixture of resin toner particles and carriers such as iron powders, that is, a binary component developer, and the toner is charged so as to be adhered to the surface of the carrier by an electrostatic force. Since the carrier is typically comprised of a magnetic material, the developer can be attracted by a magnet to form a magnetic brush. When the magnetic brush slightly touches the latent image surface and softy wipes the same through electric static force, the toner is deposited onto the recording medium by an electrostatic force to thereby develop the latent image. The developer for use in such a development process, however, deteriorates in its characteristics under the influence of humidity or after a long-time usage which is comparable to its life. The degraded characteristics raise such problems as the density of developed images is decreased even when the mixing ratio between toner and carrier or the toner density is constant, the recording medium texture is contaminated, and the development unit or peripheral equipments are contaminated. Accordingly, it is necessary to monitor the decay condition of the developer.

An approach has hitherto been made which measures the toner density, developed image density or contaminants on the texture to detect the decay condition of the developer, as seen from Japanese Patent Kokai (Laid Open) Nos. 50750/75, 29725/78, 49438/78, 49439/78, etc. This conventional measure, however, requires a reference area on the recording medium and the formation of a latent image as a criterion on the reference area. Consequently, results of the detection are affected by conditions for the formation of criterion latent image and correct detection of the deteriorated state of the developer per se is impossible.

Apart from the above disadvantages attributable to :terioration of the developer, it is experimentally proven that the amount of toners which are electrostatically adhered to carriers is decreased as the developer becomes decayed or deteriorated. Assumptively, when the developer greatly absorbs humidity and when the developer is used for its life so that scrap toner is permanently adhered by a physical force to the surface of the carrier, the toner cannot be charged sufficiently by stirring the mixture with the result that the electrostatic adherence of the toner to the carrier is degraded. If the insufficient charging of the toner is aggravated under the condition that the toner density is constant, the number of free toners (which cannot be adhered to carriers properly) is increased and the free toners aggravate contaminants on the recording medium texture and contamination of the equipments. On the other hand, the number of toners to be charged properly and adhered to carriers is so reduced as to decrease density of the developed image.

SUMMARY OF THE INVENTION

An object of this invention is to provide a developer quality monitoring device which can monitor, not through the use of the recording medium but directly, decay conditions of the developer per se.

The present invention is featured by the provision of means for converting the adherent state of toners to carriers within the developer into an electrical signal, whereby the deterioration of the developer can be monitored on the basis of the electrical signal.

In a preferred embodiment of the invention, an inductor element is located at a position at which the inductor element is magnetically affected by carriers in the developer in circulation and based on the fact that as the amount of toners to be adhered to carriers decreases, the absolute value of the inductor element output voltage is decreased and its pulsating components are increased, electrical circuits are provided for detecting the absolute value and the pulsating components.

DESCRIPTION OF THE PREFERRED EMBODIMENT

Figure 1:
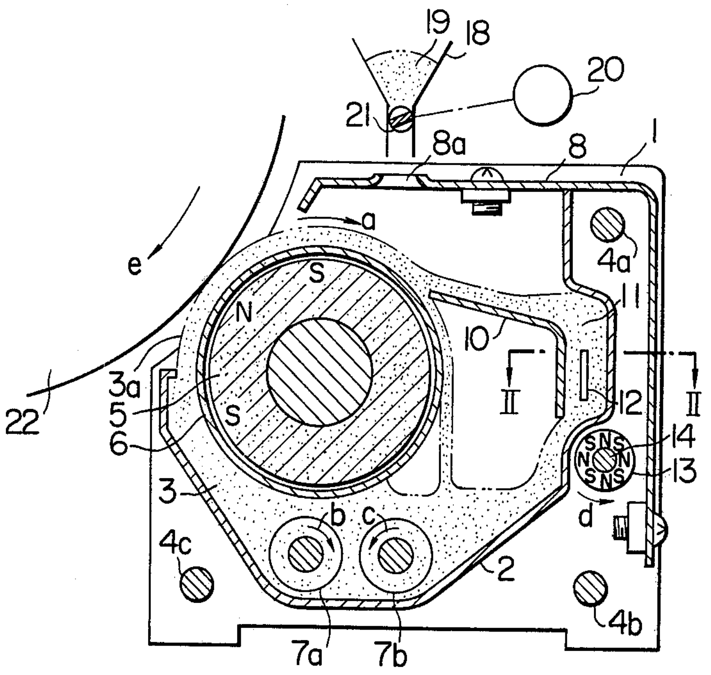
FIG. 1 is a longitudinal sectional view of a development apparatus incorporating the present invention.
Figure 2:
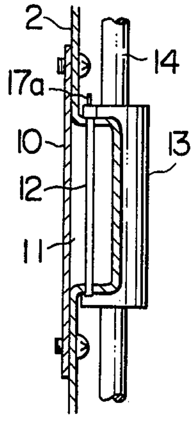
FIG. 2 is a sectional view taken on line II—II in FIG. 1.
Figure 3:
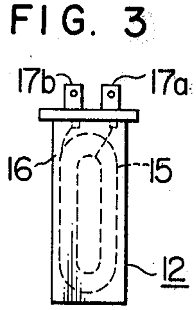
FIG. 3 is a plan view of an inductor element used in one embodiment of the invention.

Referring to FIG. 1, there is shown a development apparatus incorporating the invention which comprises a development chamber constituted by two side plates 1 (only one of which is illustrated) and a casing 2 of a non-magnetic material. A developer 3 stored in the development chamber is a mixture of toners and magnetic carriers. Spacers 4*a* to 4*c* define an accurate spacing between the opposite side plates 1 so that the casing 2 and the side plates 1 may be put together to build up the development chamber with high dimensional accuracy. A roll magnet 5 is securedly supported between the two side plates 1. A non-magnetic sleeve 6 is rotatably supported to surround the roll magnet 5. When the sleeve 6 is rotated in a direction of arrow a by an external driver (not shown), the developer follows the motion of the sleeve 6 to form a magnetic brush 3*a* along the outer circumferential surface of the sleeve 6. Stirrer screws 7*a* and 7*b* rotatably supported between the opposite side plates 1 are interlocked with the sleeve 6 to rotate in directions of arrow b and arrow c, respectively. As the stirrer screws 7*a* and 7*b* rotate, the developer 3 is stirred to uniformly mix toners and carriers and at the same time the toners are charged up by friction and adhered to the carriers. An upward opening of the development chamber is partly covered with a lid plate 8 which is formed with a toner inlet 8*a*. A non-magnetic guide plate 10 is mounted to the casing 2 as shown in FIG. 2 to define, along with a recessed portion of the casing 2, a detector chamber 11. The detector chamber 11 is opened to outside at upper and lower ends, and catches the developer 3 conveyed by the sleeve 6 and through the guide plate 10 and exhausts it into the development chamber through the lower opening. An inductor element 12 has as shown in FIG. 3 a flat-wound electrical coil 15 connected to terminals 17*a* and 17*b* and moulded with resin 16. The inductor element 12 is inserted into slots formed in the side walls of the detector chamber until the coil 15 is positioned within the detector chamber 11. A miniature roll magnet 13 is carried on a shaft 14 and located exterially of the casing 2 so as to face the lower opening of the detector chamber 11. The shaft 14 is also interlocked with the sleeve 6 to rotate in a direction of arrow d. A toner container 18 stores fresh toners 19 which are metered by a rotary metering valve 21 driven by a toner feeder motor 20 and then supplied into the development chamber via the inlet 8*a*. An electrostatic latent image recording drum 22 rotates in a direction of arrow e and during the rotation, its outer circumferential surface makes slight contact with the magnetic brush 3*a* of the developer.

Figure 4:
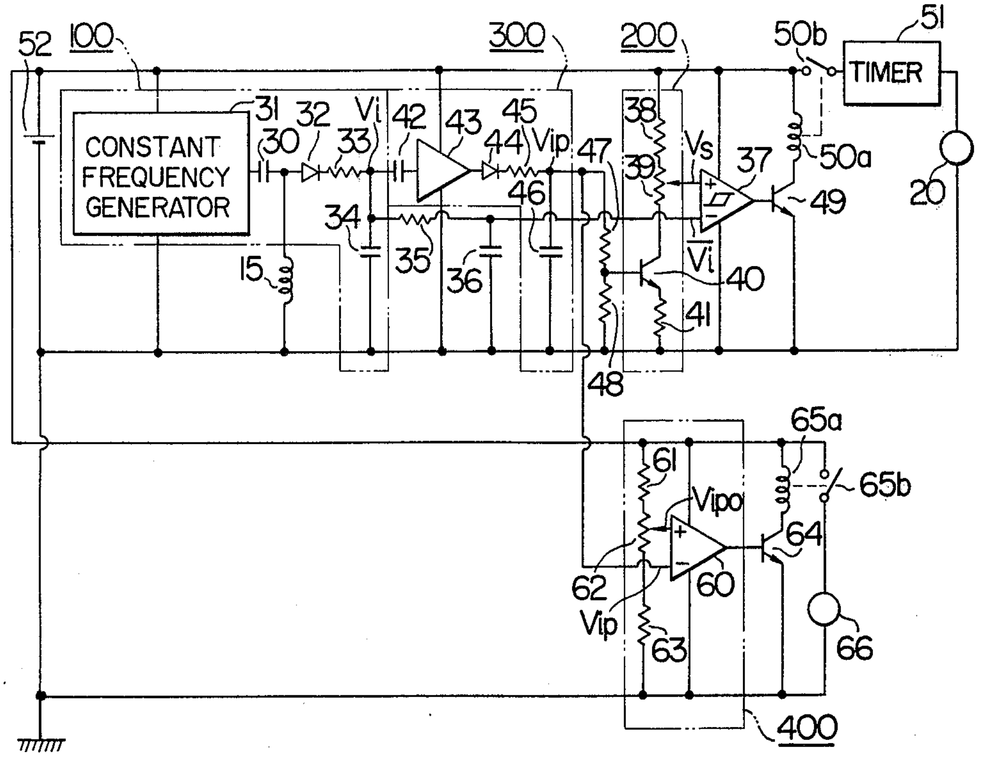
FIG. 4 is a circuit diagram of a developer quality monitoring device embodying the invention.
Figure 5:
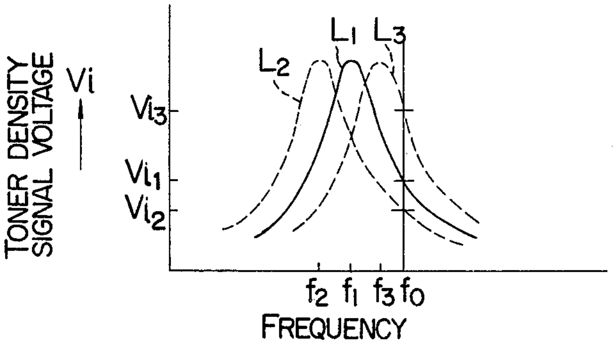
FIG. 5 is a graph showing the relation between toner density signal voltage and resonance frequency.

The developer quality monitoring device is embodied in an electrical circuit form as shown in FIG. 4. A first electrical circuit is provided wherein the coil 15 is connected via a capacitor 30 in series therewith to a constant frequency generator 31, and voltage across the coil 15 is rectified by a diode 32 and somewhat smoothed by a resistor 33 and a capacitor 34. The coil 15 and the capacitor 30 constitute a resonance circuit which resonates at frequency $f_1$ when the toner density has a reference value (equivalent to an inductance $L_1$ of the coil 15). At inductance $L_1$, voltage across the capacitor 34 representative of toner density is also related to an output frequency $f_o$ of the constant frequency generator 31 and has a value $V_{i1}$. Also, the circuit constant, the capacitance of the capacitor 30 in this example, is such that when the toner density has a lower value than the reference (equivalent to an inductance $L_2$ of the coil 15), the resonance frequency becomes $f_2$ to produce a toner density signal voltage $V_{i2}$ and when the toner density has a higher value than the reference (equivalent to an inductance $L_3$ of the coil 15), the resonance frequency becomes $f_3$ to produce a toner density signal voltage $V_{i3}$. One end of the capacitor 34 is connected to a smoothing circuit comprised of a resistor 35 and a capacitor 36. This smoothing circuit is adapted to create a toner density comparison signal voltage $\overline{V_i}$ which is applied to a comparison signal input terminal of a comparator circuit 37 acting to discriminate the toner density. Resistors 38, 39 and 41 and a transistor 40 constitute a toner density reference voltage generator circuit 200 which supplies a reference voltage $V_s$ to a reference signal input terminal of the comparator circuit 37. Voltage $V_i$ developing across the capacitor 34 is also applied to a second electrical circuit 300 comprised of a differentiating capacitor 42, an amplifier 43, a diode 44, a resistor 45 and a smoothing capacitor 46, thereby creating a decay condition signal voltage $V_{ip}$ across the smoothing capacitor 46. The smoothing capacitor 46 is connected to the base of the transistor 40 via divider resistors 47 and 48 so that the internal resistance of the transistor 40 may be controlled by the decay condition signal voltage $V_{ip}$ and hence the reference voltage $V_s$ may be adjusted accordingly. The comparator circuit 37 owns a hysteresis characteristic effective to prevent its hunting and is connected at its output to a transistor 49 which is operable to energize a relay coil 50*a* to close a normally open relay contact 50*b*. The toner feeder motor 20 is connected to a power supply 52 via the normally open relay contact 50*b* and a timer 51. A discriminator circuit as designated at reference numeral 400 is adapted to discriminate a limit of decay condition of the developer and includes a comparator circuit 60 having a reference signal input terminal connected to a voltage divider circuit of resistors 61, 62 and 63 for receiving a reference voltage $V_{ipo}$ and a comparison signal input terminal connected to the capacitor 46 for receiving the decay condition signal voltage $V_{ip}$. The output of the comparator circuit 60 is connected to the base of a transistor 64 having the collector connected to a relay coil 65*a*, whereby a normally open relay contact 65*b* is operable to turn on a pilot lamp 66.

In operation of the development apparatus as shown in FIG. 1, as the sleeve 6 rotates in the direction of arrow a, the developer 3 follows the rotation of the sleeve 6, forming the magnetic brush 3*a* along the sleeve. The magnetic brush 3*a* makes slight contact with the outer circumferential surface of the recording drum 22 for development of the latent image. The magnetic brush 3*a* in part is then conveyed through the guide plate 10 and slips down into the detector chamber 11 via its upper opening. Then, the magnetism (and conductivity) of the carrier affects the inductance of the coil 15 located within the detector chamber 11. The developer 3 is then magnetized at the lower opening of the detector chamber 11 by the roll magnet 13 and follows the rotation of the roll magnet 13 to be exhausted from the detector chamber 11. Since the supply of the developer 3 is sufficient to overflow at the upper opening of the detector chamber 11, the detector chamber 11 is filled with the developer at a constant density, the inductance of the coil 15 is inversely proportioned to the density of toners contained in the developer 3. Within the casing of the development chamber, the developer 3 is stirred by means of the stirrer screws 7*a* and 7*b* to uniformly mix toners and carriers, and concurrently, the toner and carrier are charged up by friction and the toner is electrostatically adhered to the carrier. Thereafter, the developer 3 is again attracted to the outer circumferential surface of the sleeve 6 to form the magnetic brush 3*a* for use for the repeated development. During the circulation of the developer for the development in this manner, the toner is deposited onto the latent image and consumed thereby, resulting in reduction of the density of toners contained in the developer 3.

The density of toners in the developer 3 affects the inductance of the coil 15 and is detected and controlled by the monitoring circuit as shown in FIG. 4. More particularly, when the density of toners in the developer 3 is at the reference value, the inductance of the coil 15 is $L_1$ and the toner density signal voltage $V_i$ related to the output voltage frequency $f_o$ of the oscillator 31 becomes $V_{i1}$. It is now assumed that the reference voltage $V_s$ is set to be equal to the comparison signal voltage $\overline{V_i}$ which is commensurate with the toner density signal voltage $V_{i1}$ produced when the developer 3 is not deteriorated in its characteristics. Then, when the toner density is decreased below the reference value until, for example, the inductance of the coil 15 becomes $L_2$, the transistor 49 is turned on, the relay coil 50*a* is energized to close the relay contact 50*b*, the motor 20 is operated for a predetermined time by the timer 51 to rotate the metering valve 21, and the fresh toner 19 is supplied to the development chamber. When the toner density exceeds the reference value until, for example, the inductance of the coil 15 becomes $L_3$, the transistor 49 keeps turning off, preventing the supply of the fresh toner. In this manner, the density of toners in the developer 3 is maintained within a constant range.

Figure 6:
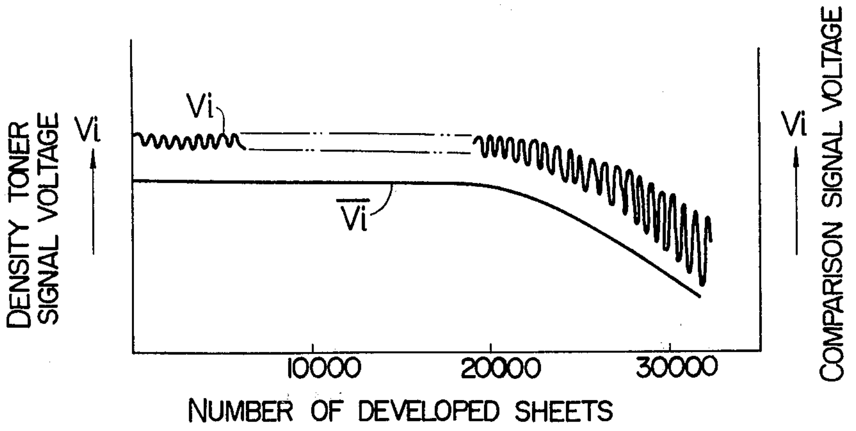
FIG. 6 is a graph showing the relation between toner density signal voltage and number of developed sheets.

Incidentally, with the toner density kept constant, repeated developments cause the toner density signal voltage $V_i$ developing across the capacitor 34 to be accompanied by increasing pulsating components and to be decreased in its absolute value as shown in FIG. 6. Assumptively, the decrease in the absolute value is due to the fact that when the developer within the chamber at high humidity absorbs moisture or when scrap toners resulting from prolonged, up to life, usage of the developer are permanently adhered to carriers, the surface of the carrier or the toner is brought into an abnormal condition in which the sufficient frictional charge cannot be obtained and as a result the number of toners adhered to the surface of carriers is decreased, so that uniformity in mixing is degraded to decrease the average distance between adjacent carriers and consequently to increase the density of the developer 3 filled in the detector chamber 11. The increasing pulsating components, on the other hand, is due to the degraded uniformity in mixing the toners and the carriers which in turn disturbs uniformity in fluidity of the developer 3 passing through the detector chamber 11 to cause pulsations in the distribution of the carriers contained in the fluid of developer 3. The decrease in absolute value and the increase in pulsations lead to the decreased image density, and increased contaminants on the texture, development apparatus or peripheral equipments.

The decrease in absolute value of the toner density signal voltage $V_i$ reduces the toner density comparison signal voltage $\overline{V_i}$ based on the voltage $V_i$, which reduced voltage $\overline{V_i}$ indicates an apparent decrease in the toner density. As a result, the comparator circuit 37 will determine a decreased toner density to turn on the transistor 49 which in turn participates in supply of the fresh toners 19 and a consequent excessive amount of toners which is responsible for increase in the number of free toners and aggravated contamination of the texture and equipments. Therefore, it is necessary to prevent the excessive supply of the fresh toners and in addition, it is desired that the toner density reference value itself be decreased correspondingly in response to a decreased number of toners which are adhered to carriers to thereby inhibit the generation of the free toners.

Figure 7:
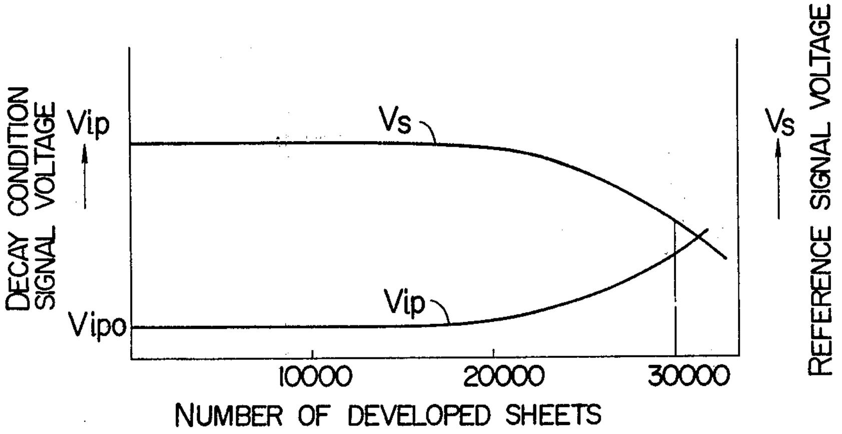
FIG. 7 is a graph showing the relation between corrected reference value, decay condition signal and number of developed sheets.

To cope with this problem, in accordance with the preferred embodiment of the invention, the pulsating components in the toner density signal voltage $V_i$ across the capacitor 34 is processed at the second electrical circuit 300 comprised of the differentiating capacitor 42, amplifier 43, diode 44, resistor 45 and smoothing capacitor 46 and converted into a decay condition signal voltage $V_{ip}$ as shown in FIG. 7. This signal voltage $V_{ip}$ is divided by the resistors 47 and 48 and applied to the transistor 40 by which the reference voltage $V_s$ generated at the reference voltage generator circuit 200 can be controlled or corrected as shown in FIG. 7. Since the controlled curve of the reference voltage $V_s$ is made commensurate with the toner density comparison signal voltage $\overline{V_i}$, it is possible to inhibit the excessive supply of the fresh toner 19 and increased contaminants on the texture, development apparatus and peripheral equipments. The greater the correction, the more effectively the generation of the free toners and contamination of the texture and equipments can be inhibited.

The inhibition against the excessive toners by the correction of reference voltage $V_s$ as described above is not successful in essential recovery of the decay condition of the developer 3 and hence, the decay condition naturally proceeds and the image density gradually decreases. The embodiment of the invention provides an expedient wherein the decay condition signal voltage $V_{ip}$ across the capacitor 46 is compared with a reference voltage $V_{ipo}$ at the decay condition discriminator circuit 400, the reference voltage $V_{ipo}$ being set in accordance with a limit of decay condition for the developer 3 used, and when the limit of decay condition is reached, the transistor 64 is turned on to energize the relay coil 65*a*, thereby closing the relay contact 65*b* so that the pilot lamp 66 is turned on to indicate that the developer 3 faces the limit of its usage. An operator is urged by matching the pilot lamp 66 turning on to exchange the developer 3 with new one.

As has been described in the foregoing embodiment, the invention can detect the decay condition of the developer per se and can provide the developer quality monitoring device which is insensitive to the external conditions such as for the formation of reference image. In accordance with the decay condition, the reference voltage value for controlling the toner density is so corrected as to inhibit the generation of excessive toner and to mitigate contaminants on the recording medium texture and development apparatus. The decay condition limit is detected and indicated on the pilot lamp in order for the operator to exchange the deteriorated developer. The electrical circuit for detecting the decay condition and that for detecting the toner density are constructed partly in common, especially the coil and the developer circulator for imparting the developer on the coil being used in common to these electrical circuits, thereby simplifying the construction of the developer quality monitoring device.

The foregoing embodiment has been explained for example only and may in part be modified. A Hall element or a magnet sensitive diode may be substituted for the coil 15 to produce the toner density signal voltage $V_i$ which is responsive to magnetism of the developer. In place of correcting the toner density reference voltage, the output voltage $V_s$ of the reference voltage generator circuit 200 may be fixed and a correction voltage may be added to the toner density comparison signal voltage $\overline{V_i}$ in accordance with the decay condition signal voltage. For detection of the decay condition limit of the developer, the decay condition discrimination circuit 400 may use the descent (the lowermost setting) of the output voltage $V_s$ of the reference voltage generator circuit 200.

What is claimed is:

1. A device for monitoring deterioration and toner density of a developer for use in an apparatus for developing with the developer a latent image formed on a recording medium, said device comprising:

(A) a developer chamber for containing the developer including toners and carriers;

(B) means for conveying the developer to a surface of said recording medium at which the latent image is formed;

(C) a detector chamber;

(D) means for causing said developer to pass through said detector chamber;

(E) a first monitoring means for monitoring density of toners of the developer passing through said detector chamber; and (F) a second monitoring means responsive to said first monitoring means for monitoring deterioration of the developer.

2. A device according to claim 1, wherein said first monitoring means comprises magneto-sensitive means disposed in said detector chamber in a position at which said magneto-sensitive means is magnetically affected by the developer, and a first electrical circuit means responsive to said magneto-sensitive means for producing a first electrical signal representative of density of the toners; and wherein said second monitoring means comprises a second electrical circuit means responsive to said first electrical signal for producing a second electrical signal representative of the deterioration of the developer in accordance with a magnitude of pulsations of said first electrical signal.

3. A device according to claim 2, wherein said magneto-sensitive means comprises a selected one of an electrical coil, a Hall element and a magneto-sensitive diode.

4. A device according to claim 2, wherein said device further comprises a condition discrimination circuit responsive to said second electrical signal for discriminating the magnitude of the deterioration.

5. A device according to claim 2, 3, or 4, further comprising a roll magnet disposed adjacent to said detector chamber in a manner so as to rotate in a predetermined rotary direction to exhaust said developer from said detector chamber.

6. A device according to claim 5, wherein said first electrical circuit comprises a constant frequency generator, a series resonance circuit constituted by a capacitor and an inductance of said magneto-sensitive means with a resonant frequency which varies in accordance with the density of toners of the developer, said series resonance circuit being connected to said constant frequency generator so as to produce an output signal relating to the constant frequency and the resonant frequency, a first rectifier for rectifying said output signal, a first smoothing circuit for smoothing an output signal of said first rectifier to produce said first electrical signal; and wherein said second electrical circuit means comprises a differentiating circuit for differentiating said first electrical signal, an amplifier for amplifying an output signal of said differentiating circuit, a second rectifier for rectifying an output signal of said amplifier, and a second smoothing circuit for smoothing an output signal of said second rectifier to produce said second electrical signal.

7. A device according to claim 6, wherein said device further comprises means responsive to an output of said second monitoring means for discriminating the magnitude of the deterioration of the developer.

8. A device according to claim 4, wherein said condition discrimination circuit comprises:

(L) means for producing a developer deterioration reference signal set in accordance with the maximum permissible developer deterioration; and (M) means for comparing said developer deterioration reference signal with said second electrical signal.

9. A device according to claim 8, further comprising indicating means, responsive to said means for comparing said developer deterioration reference signal with said second electrical signal, for indicating when the developer has reached the maximum permissible deterioration.

10. A device according to claim 1, wherein said device further comprises:

(G) means for producing a reference signal;

(H) means for comparing an output of said first monitoring means with said reference signal; and (I) means responsive to an output of said second monitoring means for controlling the relative value of said reference signal with respect to the output of said first monitoring means.

11. A device according to claim 10, wherein said device further comprises:

(J) means for adding fresh toners into said developer chamber; and (K) means connected to said toner adding means for controlling the amount of the fresh toners to be added, in accordance with an output of said comparing means.

12. A device according to claim 1 or 10, wherein said device further comprises means responsive to an output of said second monitoring means for discriminating the magnitude of the deterioration of the developer.

* * * * *